(12) United States Patent
Desai

(10) Patent No.: US 11,687,523 B2
(45) Date of Patent: Jun. 27, 2023

(54) SYSTEM AND METHOD FOR EFFICIENTLY TRANSFERRING DATA FOR OFFLINE USE

(71) Applicant: salesforce.com, inc., San Francisco, CA (US)

(72) Inventor: Sachin Desai, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/247,067

(22) Filed: Nov. 25, 2020

(65) Prior Publication Data

US 2022/0164336 A1 May 26, 2022

(51) Int. Cl.
*G06F 16/2457* (2019.01)
*G06F 16/23* (2019.01)
*G06F 16/248* (2019.01)
*G06F 16/21* (2019.01)

(52) U.S. Cl.
CPC ........ *G06F 16/2379* (2019.01); *G06F 16/214* (2019.01); *G06F 16/2358* (2019.01); *G06F 16/248* (2019.01); *G06F 16/24578* (2019.01)

(58) Field of Classification Search
CPC ............... G06F 16/2379; G06F 16/214; G06F 16/2358; G06F 16/24578; G06F 16/248
USPC ........................................................ 707/609
See application file for complete search history.

(56) References Cited

U.S. PATENT DOCUMENTS

| 4,558,413 A | 12/1985 | Schmidt et al. |
| 4,912,637 A | 3/1990 | Sheedy et al. |
| 5,428,782 A | 6/1995 | White |
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Ashish Thomas
*Assistant Examiner* — Antonio J Caiado
(74) *Attorney, Agent, or Firm* — Weaver Austin Villeneuve & Sampson LLP

(57) ABSTRACT

Disclosed are some implementations of systems, apparatus, methods and computer program products for transmitting data to a client device. A first database is generated for a client device and a client identifier of the client device is stored in association with the first database. The first database is transmitted to the client device responsive to receiving a first message from the client device. After transmitting the first database to the client device and responsive to receiving a second message from the client device, data relevant to the client device is ascertained. A delta between database records stored in the first database and the data is generated. A database message is generated and transmitted to the client device, where the database message indicates the delta and includes a client directive pertaining to updating the first database according to the delta.

17 Claims, 9 Drawing Sheets

(56) References Cited

U.S. PATENT DOCUMENTS

| | | |
|---|---|---|
| 5,835,911 A | 11/1998 | Nakagawa et al. |
| 5,850,554 A | 12/1998 | Carver |
| 5,873,096 A | 2/1999 | Lim et al. |
| 5,918,159 A | 6/1999 | Fomukong et al. |
| 5,963,953 A | 10/1999 | Cram et al. |
| 5,966,715 A | 10/1999 | Sweeney et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,202,205 B1 | 3/2001 | Saboff et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,401,238 B1 | 6/2002 | Brown et al. |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,100,195 B1 | 8/2006 | Underwood |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,480,907 B1 * | 1/2009 | Marolia .................... G06F 8/65 717/172 |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,751,464 B1 | 6/2014 | Weiss et al. |
| 9,503,535 B2 | 11/2016 | Desai |
| 9,778,820 B2 | 10/2017 | Desai et al. |
| 10,146,597 B2 | 12/2018 | Pack, III et al. |
| 10,175,873 B2 | 1/2019 | Desai |
| 10,310,850 B2 | 6/2019 | Duppenthaler et al. |
| 10,325,079 B1 | 6/2019 | Vukich et al. |
| 10,852,991 B1 * | 12/2020 | Ciou .................... G06F 3/0611 |
| 10,855,761 B1 * | 12/2020 | Jenks .................... H04L 67/28 |
| 11,061,667 B1 * | 7/2021 | Gujarathi ................ H04L 67/34 |
| 2001/0044791 A1 | 11/2001 | Richter et al. |
| 2002/0072951 A1 | 6/2002 | Lee et al. |
| 2002/0073110 A1 | 6/2002 | Duvillier et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |

(56) References Cited

U.S. PATENT DOCUMENTS

| | | |
|---|---|---|
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0210885 A1 | 10/2004 | Wang et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0282441 A1 | 12/2006 | Weller et al. |
| 2007/0226272 A1* | 9/2007 | Huang .................. G06F 16/273 |
| 2007/0260607 A1 | 11/2007 | Hajdukiewicz et al. |
| 2008/0133678 A1 | 6/2008 | Woodham et al. |
| 2008/0134165 A1 | 6/2008 | Anderson et al. |
| 2008/0249972 A1 | 10/2008 | Dillon |
| 2009/0037393 A1* | 2/2009 | Fredricksen ............ G06F 16/93 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0010344 A1* | 1/2011 | Sjogren .................. G06F 16/27 |
| | | 707/638 |
| 2011/0218958 A1 | 9/2011 | Warshavsky et al. |
| 2011/0247051 A1 | 10/2011 | Bulumulla et al. |
| 2011/0269424 A1* | 11/2011 | Multer ................ H04L 67/1095 |
| | | 455/411 |
| 2012/0011496 A1 | 1/2012 | Shimamura |
| 2012/0042218 A1 | 2/2012 | Cinarkaya et al. |
| 2012/0159389 A1 | 6/2012 | Keith et al. |
| 2012/0233137 A1 | 9/2012 | Jakobson et al. |
| 2012/0290407 A1 | 11/2012 | Hubbard et al. |
| 2012/0330887 A1* | 12/2012 | Young .................. G06F 16/275 |
| | | 707/610 |
| 2013/0036200 A1* | 2/2013 | Roberts ............... H04L 65/1093 |
| | | 709/219 |
| 2013/0093829 A1 | 4/2013 | Rosenblatt et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0007084 A1* | 1/2014 | Ding ........................ G06F 8/61 |
| | | 717/178 |
| 2014/0026045 A1 | 1/2014 | Andres et al. |
| 2014/0101096 A1* | 4/2014 | Pfeifle .................... G06F 16/27 |
| | | 707/609 |
| 2014/0237465 A1 | 8/2014 | Lin |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0378454 A1 | 12/2016 | Nekrestyanov et al. |
| 2018/0025042 A1* | 1/2018 | Fischer ............. G06F 16/24573 |
| | | 707/625 |
| 2018/0121322 A1 | 5/2018 | Reyes et al. |
| 2018/0253467 A1* | 9/2018 | Gurajada ............ G06F 11/1471 |
| 2018/0276559 A1 | 9/2018 | Kodali et al. |
| 2019/0155598 A1 | 5/2019 | Bainville et al. |
| 2019/0251198 A1* | 8/2019 | Shamsutdinov ...... G06F 21/602 |
| 2019/0253476 A1* | 8/2019 | Lee ..................... G06F 16/9017 |
| 2020/0162462 A1* | 5/2020 | Zayats ................ G06F 16/2379 |
| 2020/0194004 A1 | 6/2020 | Bates |
| 2020/0409690 A1 | 12/2020 | Rouland et al. |
| 2021/0382708 A1 | 12/2021 | Sagal et al. |
| 2021/0392142 A1 | 12/2021 | Stephens et al. |
| 2022/0035544 A1* | 2/2022 | Liu ........................ G06F 3/0673 |
| 2022/0075782 A1* | 3/2022 | Hines .................... G06F 16/211 |
| 2022/0171778 A1* | 6/2022 | Desai .................. G06F 16/9035 |

OTHER PUBLICATIONS

U.S. Appl. No. 17/247,116, filed Nov. 30, 2020, Desai.
U.S. Final office Action dated Sep. 9, 2022 in U.S. Appl. No. 17/247,116.
U.S. Non-Final Office Action dated Mar. 29, 2022, in U.S. Appl. No. 17/247,116.

* cited by examiner

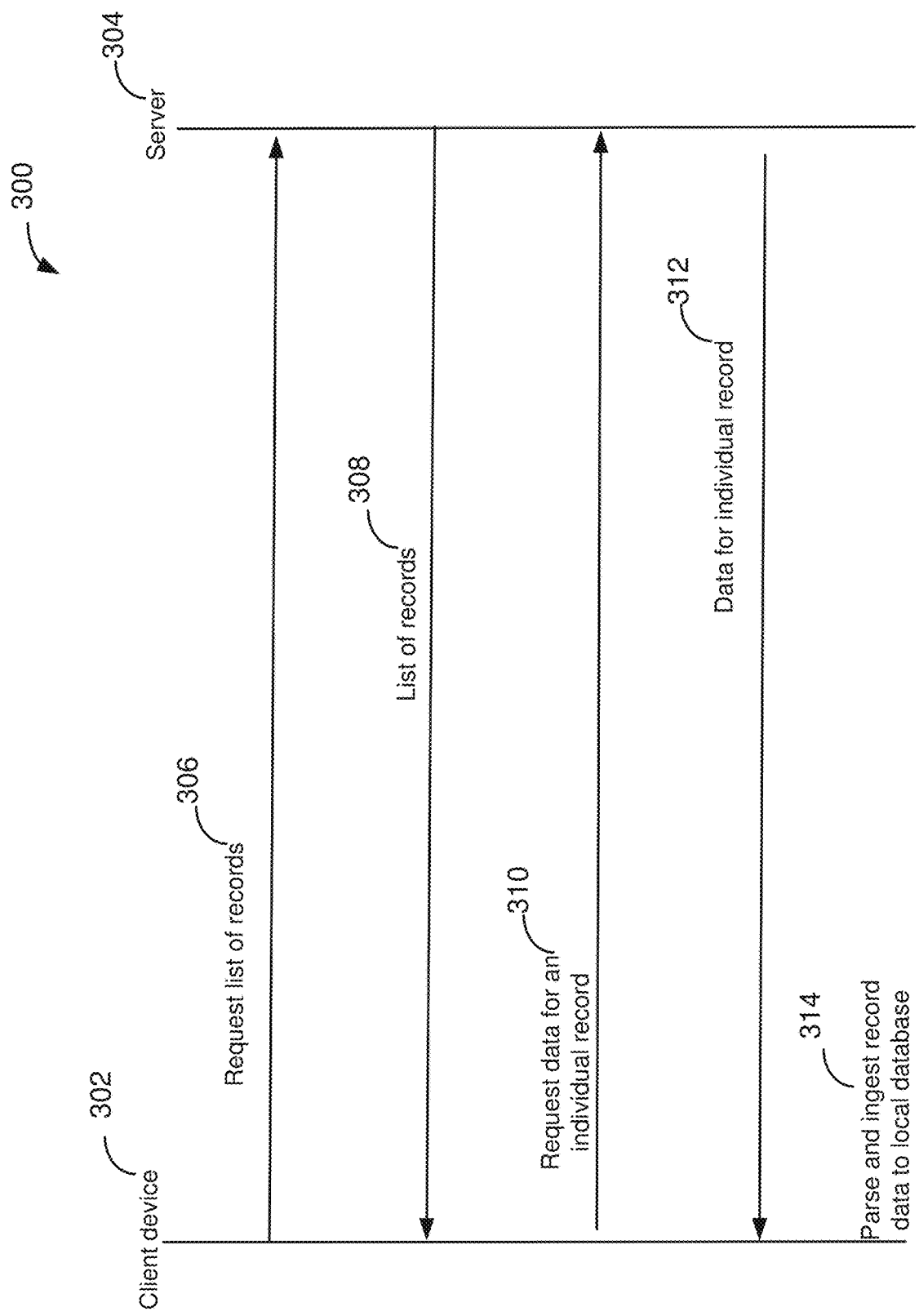

SYSTEM AND METHOD FOR EFFICIENTLY TRANSFERRING DATA FOR OFFLINE USE

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with transferring data to a computing device. More specifically, this patent document discloses techniques for efficiently transferring data to mobile devices for offline use.

BACKGROUND

Many businesses employ mobile applications that enable their employees to work remotely. In some instances, specific mobile applications are developed that enable employees to work offline. One example of such a mobile application is a field service application designed for use by field service technicians.

To enable a field service technician to work offline, service appointment data and other information that the field service technician will use when out in the field is typically pre-loaded onto their computing device. In some instances, the field technician will be offline for an extended period of time. As a result, the amount of data that is pre-loaded onto the computing device can be substantial.

BRIEF DESCRIPTION OF THE DRAWINGS

The included drawings are for illustrative purposes and serve only to provide examples of possible structures and operations for the disclosed systems, apparatus, methods and computer program products for transferring data to a client device. These drawings in no way limit any changes in form and detail that may be made by one skilled in the art without departing from the spirit and scope of the disclosed implementations.

FIG. 3A shows a transaction flow diagram 300 illustrating an example of a process for transferring data on a per-record basis.

DETAILED DESCRIPTION

Figure 1:
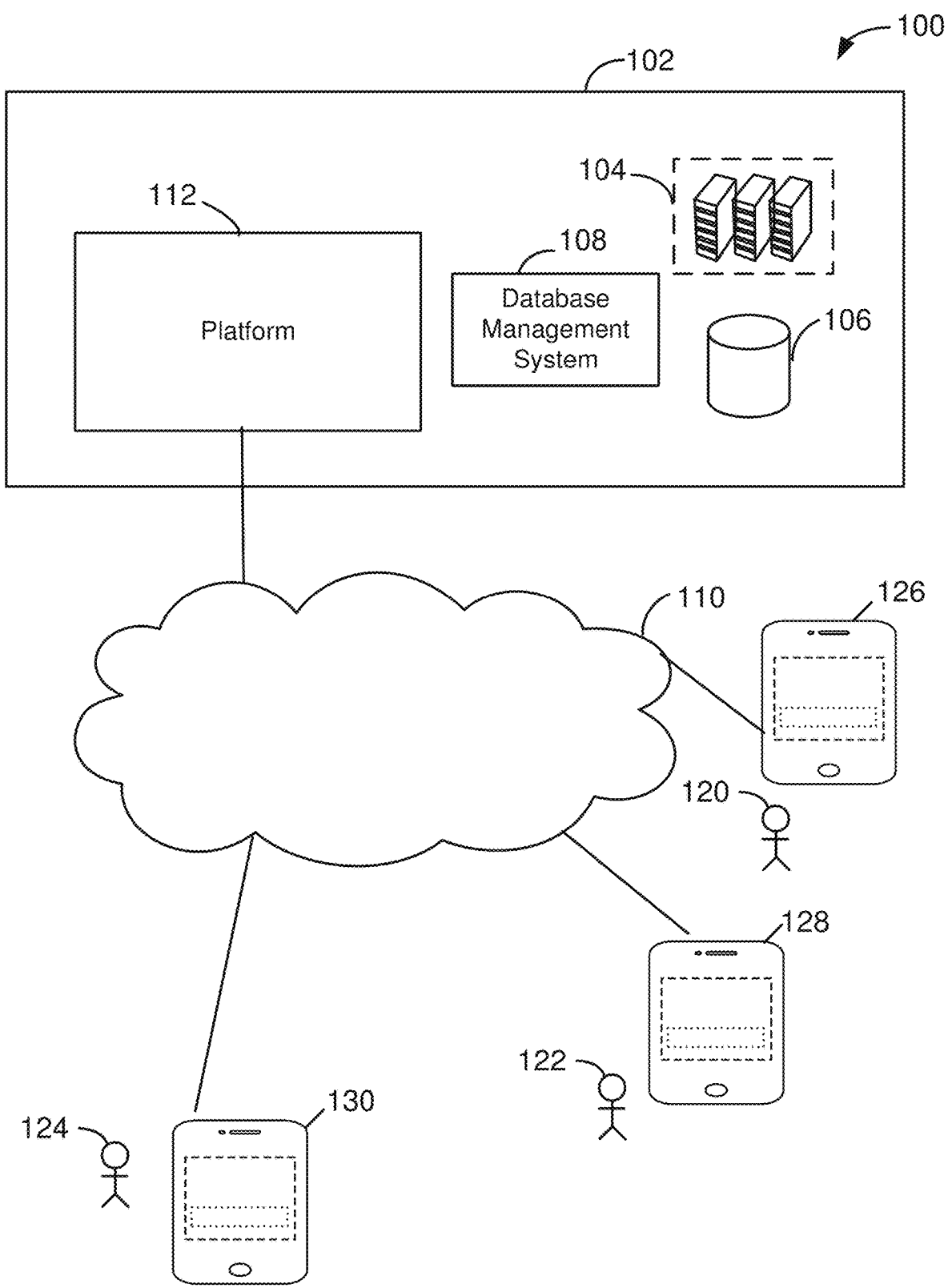
FIG. 1 shows a system diagram of an example of a system 100 in which a database management system is implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Any of the disclosed implementations may be used alone or together with one another in any combination. The one or more implementations encompassed within this specification may also include examples that are only partially mentioned or alluded to or are not mentioned or alluded to at all in this brief summary or in the abstract. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

Some implementations of the disclosed systems, apparatus, methods and computer program products are configured for efficiently transferring data to a client device for offline use. In some implementations, a database system implemented using a server system generates a database including a plurality of database records for a client device and transmits the database to the client device for storage at the client device. At a later time, the server system ascertains data that is relevant to the client device. The server system generates a delta between the database records and the data relevant to the client device. The server system generates and transmits database message(s) representing the delta to the client device, enabling the client device to update its local copy of the database.

In some implementations, the delta represents modifications to be made to the database stored at the client device. More particularly, the delta may represent database record data not stored in the database. In addition, the delta can represent other changes to be made to the database at the client device including, but not limited to, record data insertions, deletions, or replacements. The delta can also represent changes to metadata stored at the client database.

In some implementations, the database message further includes a client directive instructing the client device to update the database according to the delta. More particularly, the client directive can provide instructions regarding the meaning of the delta and/or the manner in which the database is to be updated by the client device according to the delta. For example, the client directive can provide instructions to add database record data to the database, replace specific identified database record(s) in the database with the database record data or portion thereof, replace data in specific field(s) of the identified database record(s) in the database, or insert the database record data or a portion thereof at a particular location in the database. As another example, a directive can instruct the client device to delete specific record data (e.g. by identifying particular database record(s) or location(s) in the database).

In some implementations, the server system communicates with the client device to confirm sufficient memory availability prior to sending a database or subsequent database record data to a client device. In the event the client device does not have sufficient memory available, the client device can release memory by performing garbage collection. The server system can initiate or resume sending the database or subsequent database record data after it has confirmed that the client device can accommodate the database or additional database record data. In some implementations, the client device can request that the server system transmit or resume transmitting the database or database record data after it has determined that it has sufficient memory available to complete a data transfer.

In some implementations, the server system maintains a client database for each client device. The client database is identical to the database that is transmitted to and stored at the client device. In other words, the client database is a copy of the database that the client maintains locally. The server system can maintain its copy of the database until it confirms that the client device successfully received the subsequent database record data. Upon receiving confirmation that the transmission of the subsequent database record data to the client device was successful, the server system can update its database or replace its database such that it incorporates the updates including the additional database record data transmitted to the client device. In this manner, the server can ensure that the database stored locally at the client device is identical to the client database stored and maintained by the server system.

Typically, database information including record data is transmitted to a client device such as a mobile device on a per-record basis or via a batch process. Upon receiving the record data, the client device parses the record data and formats it for entry into its local database. This is a time-consuming process that can consume significant memory and processing resources. Moreover, a number of mobile devices have limited memory and processing capabilities, making the record data transfer even more cumbersome and problematic.

In some implementations, to solve this problem, an initial client database storing relevant database records is transmitted to a client device. At a subsequent time, a delta representing updates to the database can be transmitted to the client device. More particularly, the delta may represent database record data not previously stored in the database or transmitted to the client device. A directive transmitted to the client device can provide specific instructions regarding the processing of the delta. Through this process, the memory and processing resources consumed by a client device during a data transfer can be minimized while ensuring that data is transferred in an efficient manner.

By way of illustration, Mary is a field service technician employed at Cane Cable Company and has been tasked with the responsibility of installing cable at customer locations. Cane has given Mary a mobile device with an application that she accesses to complete her job duties on a daily basis. Since she is often working in remote areas with limited network availability, all of the information she uses to complete her daily tasks is stored locally on the mobile device. Sometimes, she is in a remote area for a period of weeks. Unfortunately, the mobile device is an older model that has limited memory and processing resources.

When Mary started her position at Cane, the company's server system generated a database for Mary and transmitted the database to the application installed on Mary's device. The application stored the database in local storage at the client device for subsequent offline access by Mary. The database includes database records storing Mary's work orders and other information she uses to perform her daily tasks. Specifically, the database stored on Mary's device includes a schedule listing an appointment date and time for each of her appointments. In addition, the database includes a name, address, and phone number for each appointment. The database also includes instructions and knowledge articles that assist Mary in performing tasks pertaining to cable installation.

Mary travels to a location with no Internet access and uses the application to access the information to reach her appointments and install cable while on-site. After Mary returns from a remote location, the application installed on the mobile device communicates with the server system to notify the server system of any changes to the local database made by Mary in the field. In addition, the server system communicates with the mobile device to update the local database stored at the mobile device. More particularly, the server system sends the mobile device a directive and a delta representing updates to be made to the database stored locally on Mary's mobile device. The mobile device follows the directive received from the server system to update the database according to the delta. The server system also updates or replaces its own database for Mary to reflect the delta it has generated. The updates include appointment information associated with new appointments that Mary is tasked to complete. Mary also notices that her completed appointments are no longer listed in her schedule. Sometimes, Mary notices new knowledge articles are added when the cable technology is updated. In addition, she finds that outdated knowledge articles are periodically removed or replaced as new technology is developed.

FIG. 1 shows a system diagram of an example of a system 100 in which a database management system is implemented, in accordance with some implementations. Database system 102 includes a variety of different hardware and/or software components that are in communication with each other. In the non-limiting example of FIG. 1, system 102 includes any number of computing devices such as servers 104. Servers 104 are in communication with one or more storage mediums 106 configured to store and maintain relevant data and/or metadata used to perform some of the techniques disclosed herein, as well as to store and maintain relevant data and/or metadata generated by the techniques disclosed herein. Storage mediums 106 may further store computer-readable instructions configured to perform some of the techniques described herein. Storage mediums 106 can also store client databases, client database delta information, user profiles, database records, knowledge articles, and other documents that include information that is relevant to tasks that will be performed offline.

System 102 includes a database management system 108 that facilitates database management. Database management system 108 is configured to facilitate generation, transmission, and updating of databases stored locally at client devices via applications installed on the client devices. Database management system 108 can also maintain one or more client databases for each user or client device. Client databases can include database(s) directly accessible by servers 104, as described herein. In some implementations, servers 104 cannot directly access a database stored in memory of a client device. Each database can include one or more database tables.

In some implementations, system 102 is configured to store user profiles/user accounts associated with users of system 102. Information maintained in a user profile of a user can include a client identifier such an Internet Protocol (IP) address or Media Access Control (MAC) address. In addition, the information can include a unique user identifier such as an alpha-numerical identifier, the user's name, a user email address, and credentials of the user. Credentials of the user can include a username and password. The information can further include job related information such as a job title, role, group, department, organization, and/or experience level, as well as any associated permissions. Job related information and any associated permissions can be applied by database management system 108 to facilitate database management, as described herein.

Client devices 126, 128, 130 may be in communication with system 102 via network 110. More particularly, client devices 126, 128, 130 may communicate with servers 104 via network 110. For example, network 110 can be the Internet. In another example, network 110 comprises one or more local area networks (LAN) in communication with one or more wide area networks (WAN) such as the Internet.

Embodiments described herein are often implemented in a cloud computing environment, in which network 110, servers 104, and possible additional apparatus and systems such as multi-tenant databases may all be considered part of the "cloud." Servers 104 may be associated with a network domain, such as www.salesforce.com and may be controlled by a data provider associated with the network domain. In this example, employee users 120, 122, 124 of client computing devices 126, 128, 130 have accounts at salesforce.com®. By logging into their accounts, users 126, 128, 130 can access the various services and data provided by system 102 to employees. Examples of devices used by users include, but are not limited to a desktop computer or portable electronic device such as a smartphone, a tablet, a laptop, a wearable device such as Google Glass®, another optical head-mounted display (OHMD) device, a smart watch, etc.

In some implementations, users 120, 122, 124 of client devices 126, 128, 130 can access services provided by system 102 via platform 112 or an application installed on client devices 126, 128, 130. More particularly, client devices 126, 128, 130 can log into system 102 via an application programming interface (API) or via a graphical user interface (GUI) using credentials of corresponding users 120, 122, 124 respectively.

Client devices 126, 128, 130 can communicate with system 102 to facilitate data transfer, as described herein. Communications between client devices 126, 128, 130 and system 102 can be initiated by a user 120, 122, 124. Alternatively, communications can be initiated by system 102 and/or application(s) installed on client devices 126, 128, 130. Therefore, communications between client devices 126, 128, 130 and system 102 can be initiated automatically or responsive to a user request.

Figure 2:
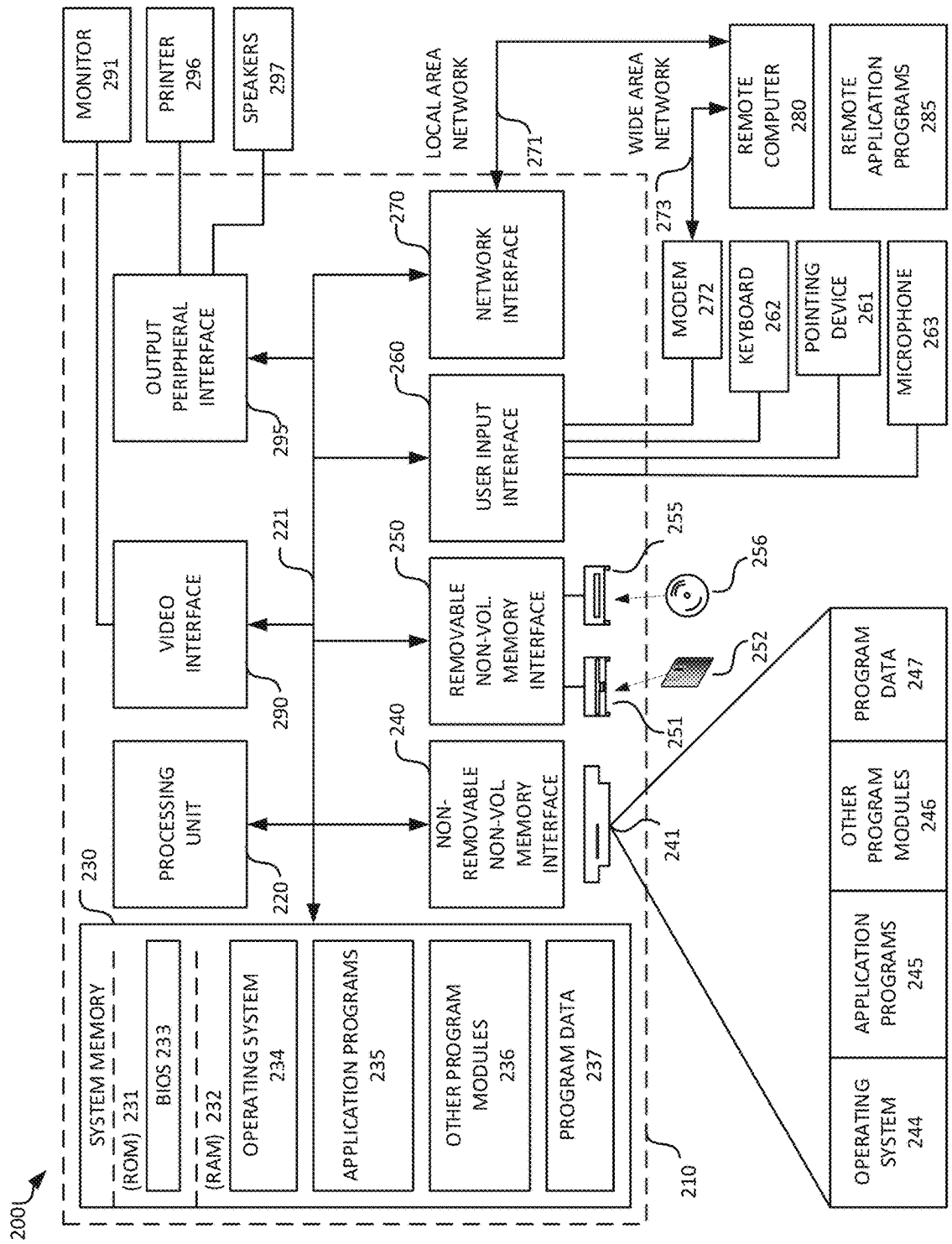
FIG. 2 is a diagram of an example computing system 200 that may be used with some implementations.

FIG. 2 is a diagram of an example computing system 200 that may be used with some implementations. In diagram 202, computing system 210 may be used by a user to establish a connection with a server computing system. For example, the user may use a browser associated the computing system 200 to access a website associated with an application deployed with a PaaS.

The computing system 210 is only one example of a suitable computing system, such as a mobile computing system, and is not intended to suggest any limitation as to the scope of use or functionality of the design. Neither should the computing system 210 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 210 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some implementations may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some implementations may also be practiced in distributed computing environments where tasks are performed by remote processing devices that are linked through a communications network. In a distributed computing environment, program modules may be located in both local and remote computer storage media including memory storage devices.

Referring to FIG. 2, the computing system 210 may include, but is not limited to, a processing unit 220 having one or more processing cores, a system memory 230, and a system bus 221 that couples with various system components including the system memory 230 to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 210 typically includes a variety of computer program product. Computer program product can be any available media that can be accessed by computing system 210 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 210. Communication media typically embodies computer readable instructions, data structures, or program modules.

The system memory 230 may include computer storage media in the form of volatile and/or nonvolatile memory such as read only memory (ROM) 231 and random-access memory (RAM) 232. A basic input/output system (BIOS) 233, containing the basic routines that help to transfer information between elements within computing system 210, such as during start-up, is typically stored in ROM 231. RAM 232 typically contains data and/or program modules that are immediately accessible to and/or presently being operated on by processing unit 220. By way of example, and not limitation, FIG. 2 also illustrates operating system 234, application programs 235, other program modules 236, and program data 237.

The computing system 210 may also include other removable/non-removable volatile/nonvolatile computer storage media. By way of example only, FIG. 2 also illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2 provide storage of computer readable instructions, data structures, program modules and other data for the computing system 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. The operating system 244, the application programs 245, the other program modules 246, and the program data 247 are given different numeric identification here to illustrate that, at a minimum, they are different copies.

A user may enter commands and information into the computing system 210 through input devices such as a keyboard 262, a microphone 263, and a pointing device 261, such as a mouse, trackball or touch pad or touch screen. Other input devices (not shown) may include a joystick, game pad, scanner, or the like. These and other input devices are often connected to the processing unit 220 through a user input interface 260 that is coupled with the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 290.

The computing system 210 may operate in a networked environment using logical connections to one or more remote computers, such as a remote computer 280. The remote computer 280 may be a personal computer, a handheld device, a server, a router, a network PC, a peer device or other common network node, and typically includes many or all the elements described above relative to the computing system 210. The logical connections depicted in FIG. 2 include a local area network (LAN) 271 and a wide area network (WAN) 273 but may also include other networks. Such networking environments are commonplace in offices, enterprise-wide computer networks, intranets and the Internet.

When used in a LAN networking environment, the computing system 210 may be connected to the LAN 271 through a network interface or adapter 270. When used in a WAN networking environment, the computing system 210 typically includes a modem 272 or other means for establishing communications over the WAN 273, such as the Internet. The modem 272, which may be internal or external, may be connected to the system bus 221 via the user-input interface 260, or other appropriate mechanism. In a networked environment, program modules depicted relative to the computing system 210, or portions thereof, may be stored in a remote memory storage device. By way of example, and not limitation, FIG. 2 illustrates remote application programs 285 as residing on remote computer 280. It will be appreciated that the network connections shown are exemplary and other means of establishing a communications link between the computers may be used.

It should be noted that some implementations may be carried out on a computing system such as that described with respect to FIG. 2. However, some implementations may be carried out on a server, a computer devoted to message handling, handheld devices, or on a distributed system in which different portions of the present design may be carried out on different parts of the distributed computing system.

Another device that may be coupled with the system bus 221 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 272 may employ a Wireless Application Protocol (WAP) to establish a wireless communication channel. The communication module 272 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Typically, when data is transferred to a client device for offline use, the data is transmitted in textual form that the client device is then tasked with parsing. For example, the data may be transmitted in Javascript Object Notation (JSON) format. In the event that the data is compressed to reduce download time, the client device is then tasked with decrypting the data before it can parse the data. The client device then formats the parsed data and stores the formatted data in its local database. Examples of this process are described below with reference to FIGS. 3A and 3B.

FIG. 3A shows a transaction flow diagram 300 illustrating an example of a process for transferring data on a per-record basis. Steps performed by a client device and server are represented via vertical lines 302, 304, respectively. As shown in this example, client device 302 sends an inquiry to determine which data it will be using offline. For example, client device 302 can send a request for a list of records at 306 to server 304. Server 304 responds by sending a list of records at 308 to client device 302. Client device 302 then proceeds with requesting data for each individual record at 310 from server 304. In response to requests received from client device 302, server 304 transmits data for corresponding individual data records to client device 302 at 312. The process repeats at 310 for each data record. Client device parses the individual data records to obtain data from fields of the individual data records, formats the data, and stores the formatted data to its local database stored in a memory of client device 302 at 314.

Figure 3B:
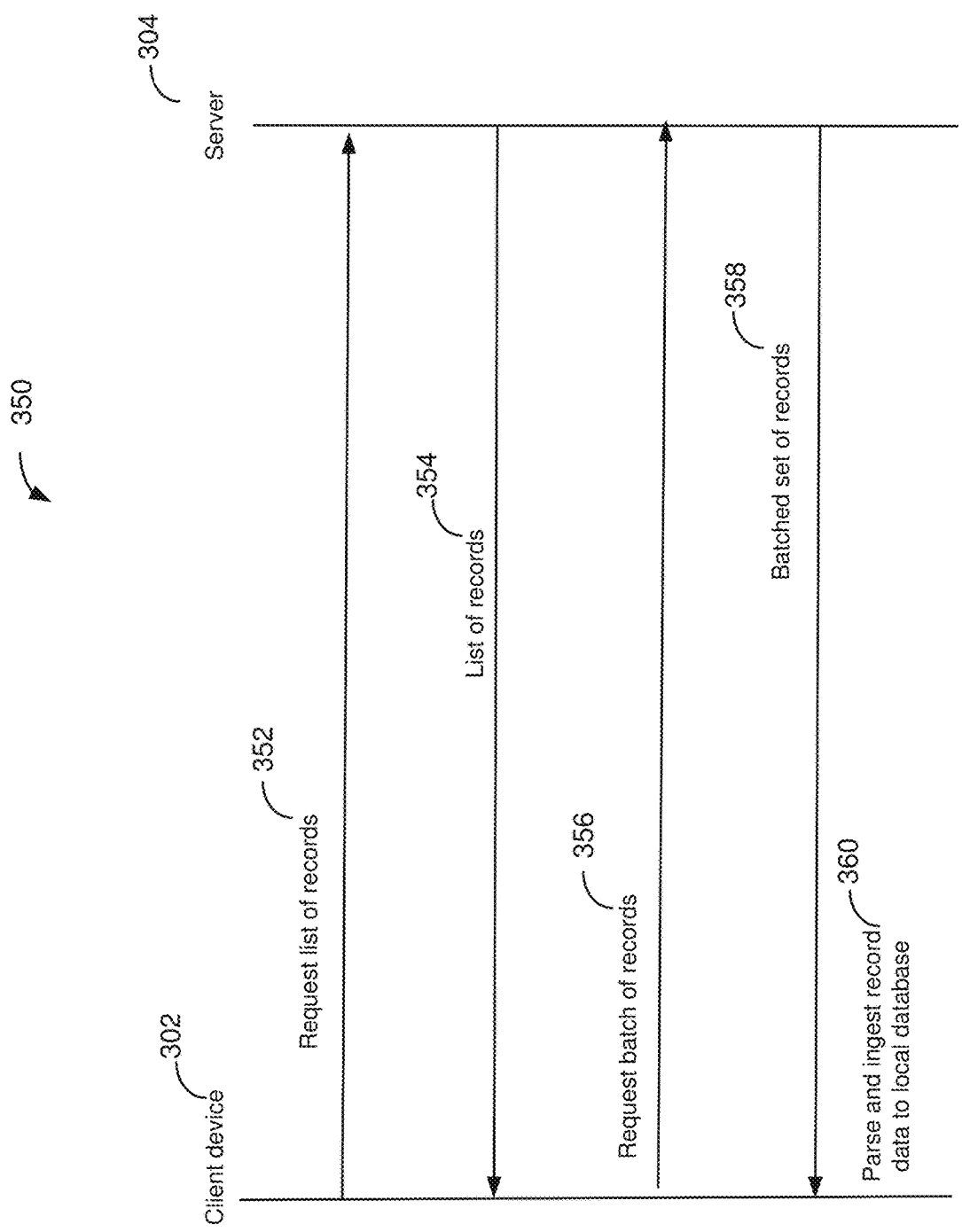
FIG. 3B shows a transaction flow diagram 350 illustrating an example of a process for transferring data according to a batch process.

FIG. 3B shows a transaction flow diagram 350 illustrating an example of a process for transferring data according to a batch process. Similarly, in this example, client device 302 sends an inquiry to determine which data it will be using offline. For example, client device 302 can send a request for a list of records at 352 to server 304. Server 304 responds by sending a list of record identifiers at 354 to client device 302. Client device 302 then requests a batch of records associated with the record identifiers at 356 from server 304. In response, server 304 transmits a batched set of records to client device 302 at 358. The process can repeat for each batch.

Client device 302 downloads and unpacks the records from each batched set of records, parses the individual data records to obtain data from fields of the individual data records, formats the data, and stores the formatted data to its local database stored in a memory of client device 302 at 360.

As shown and described above with reference to FIGS. 3A and 3B, each data record is typically processed individually by the client device. Since the client device can receive thousands of database records from the server, the population of a local database is typically a resource-intensive and time-consuming process. In addition, as more data records are added to the local database of the client device, it becomes increasingly likely that inefficiencies will arise as a result of reduced memory resources.

In accordance with various implementations, a mobile application installed on a client device communicates with a database system to obtain data that can be accessed offline via the mobile application. For example, the client device can communicate with a server system of database system. Specifically, the client device can initiate communications with the server system and/or respond to communications from the server system. In some implementations, the client device can initiate communications responsive to user input.

Figure 4:
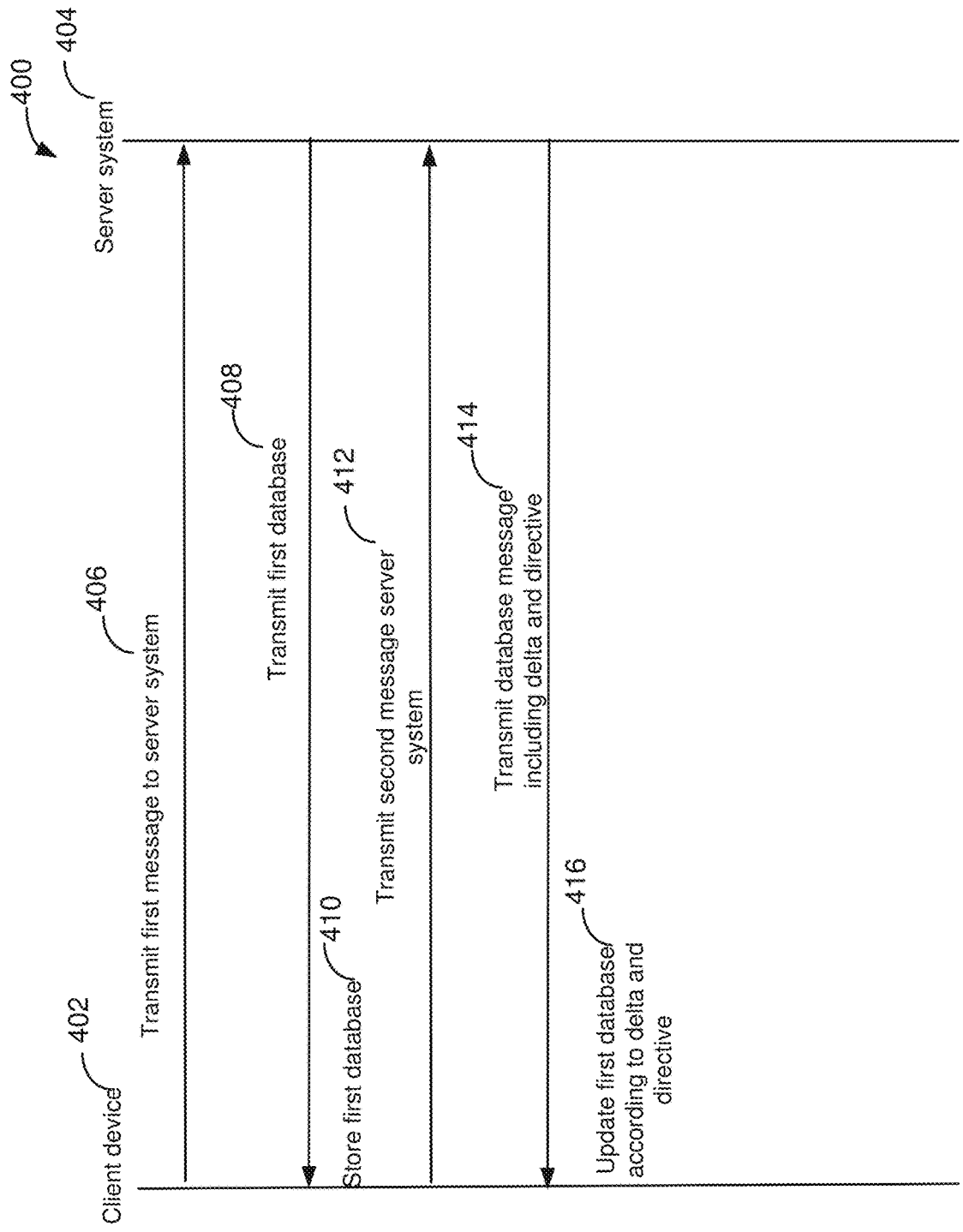
FIG. 4 shows a transaction flow diagram 400 illustrating an example of a process for updating a database stored at a client device, in accordance with some implementations.

FIG. 4 shows a transaction flow diagram 400 illustrating an example of a process for updating a database stored at a client device, in accordance with some implementations. Steps performed by a client device and server system are represented by vertical lines, 402, 404, respectively. Client device 402 transmits a first message to server system 404 at 406. For example, a mobile application installed on client device 402 can transmit the first message automatically, responsive to a login of the user to the mobile application or database system, responsive to a user command to update the data stored locally at the client device, responsive to loading of the mobile application, responsive to detection of a network signal, and/or other triggering event.

Server system 404 can generate a first database for client device 402, as will be described in further detail below. The first database can include a plurality of database records. For example, database records can include articles, blogs, customer data, job-related instructions, schedules, timesheets, etc. To generate the first database, server system 404 can retrieve database records from one or more databases accessible to server system 404. The first database can be generated responsive to a client communication or prior to receiving a client communication.

Server system 404 can store the first database in association with an identifier associated with client device 402. The identifier can include, for example, a client identifier, user identifier, or some combination thereof.

Server system 404 may obtain the identifier associated with client device 402 from the first message and use the identifier to store and/or uniquely identify the pertinent database for client device 402. Server system 404 transmits the first database to client device 402 at 408.

Server system 404 can transmit the first database or a link thereto. For example, the link can include a uniform resource locator (URL) via which client device 402 can access the first database or a copy thereof.

Responsive to the first message, client device 402 receives the first database from server system 404 and stores the first database locally in memory of client device 402 at 410. More particularly, the memory can include random-access memory (RAM). In some implementations, client device 402 accesses the first database or a copy thereof via a link provided in the first message. A user of client device 402 can access data stored in the first database by accessing the mobile application. Since the data is stored locally to client device 402, the user can access the data offline while at a remote location that does not have Internet access.

The first database stored locally at client device 402 can be updated at client device 402 at a later time. For example, the first database can be updated locally at client device 402 the next time the user is at a location that has Internet access. At that time, client device 402 (e.g., mobile application installed on client device 402) can transmit a second message at 412 to server system 404. For example, the second message can request updates to the first database.

Responsive to the second message, client device 402 can receive a database message from server system 404 at 414, where the database message notifies client device 402 of changes to be made to the first database stored locally at client device 402. As will be described in further detail below, the database message can include a delta representing changes to be made to the first database and a directive pertaining to updating the first database according to the delta. For example, the delta can represent database data not previously stored in the first database and the directive can provide instructions as to the manner in which the first database is to be updated with the database data. An example server process for identifying and communicating database changes to a client device will be described in further detail below with reference to FIG. 5.

Client device 402 can update its local copy of the first database according to the delta and directive. For example, the delta can represent additional database data, database data (e.g., database records) to be deleted from the first database, specific location(s) at which additional database data is to be inserted, and/or specific record(s) that are to be replaced.

In some implementations, the delta and/or associated directive can be represented digitally. For example, the delta and/or directive can represent bits or bytes that are to be modified or applied by client device 402 to modify its local database.

Figure 5:
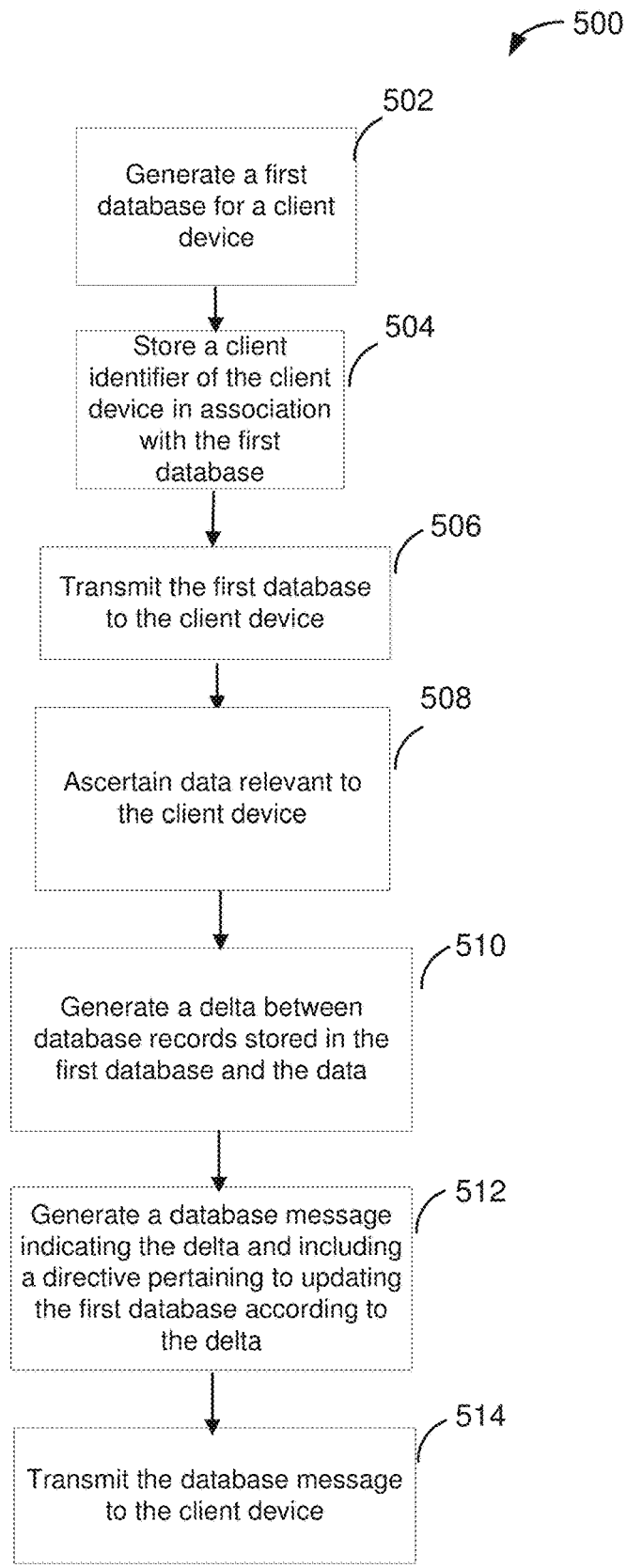
FIG. 5 shows a process flow diagram 500 illustrating an example of a process for transferring data, in accordance with some implementations.

FIG. 5 shows a process flow diagram 500 illustrating an example of a process for transferring data, in accordance with some implementations. A server system generates a first database for a client device at 502. More particularly, the server system can compile resources within the first database that are relevant to the client device. The first database can include, for example, a schedule, appointment information, customer information, knowledge articles, blogs, and/or instructional manuals. The first database can include a plurality of database records that are accessible by the user via the client device. In some implementations, the first database can be accessed via a mobile application installed on the client device.

The first database can be generated based, at least in part, on a profile associated with the client device or user of the client device. For example, the profile can include a user profile that indicates a level of permissions associated with the user, a job title, job description, group within the company, and/or experience level.

The server system can store an identifier in association with the first database at 504. For example, the server system can store the identifier in association with the server's copy of the first database (e.g., client database). In this example, the identifier is a client identifier such as an IP or MAC address. In other implementations, the identifier can be a user identifier, group identifier, or combination thereof.

The server system transmits the first database to the client device at 506. More particularly, the server system can transmit the first database by sending the first database or a link thereto. In some implementations, the server system transmits the first database to the client device responsive to a first message received from the client device. Specifically, the server can uniquely identify the client device by obtaining the pertinent identifier from the first message. This identifier can be used to either retrieve the first database using the identifier or generate the first database using information in a profile associated with the identifier. Therefore, the first database can be generated prior to receiving the first message or responsive to receiving the first message.

After transmitting the first database to the client device and responsive to receiving a second message from the client device, the server system ascertains data relevant to the client device at 508. More particularly, the server system can obtain an identifier from the second message to identify the client device and/or user, and subsequently ascertain data that would be relevant to the client device and/or user of the client device. For example, the server system can generate a second database for the client device in a manner similar to that set forth above with respect to generation of the first database.

The server system generates a delta between the first database (e.g., client database accessible by the server system) and the data (e.g., the second database) at 510. More particularly, the delta can represent the difference between database records stored in the first database and the data ascertained at 508. The delta can represent database record data not stored in the first database. In addition, the delta can represent additional information such as data and/or metadata that is to be added to the client's local database, deleted from the client's local database, location(s) at which data is to be inserted into the client's local database, or specific database records that are to be replaced in the client's local database.

The server system generates a database message at 512, where the database message indicates the delta and includes a client directive pertaining to updating the first database at the client device according to the delta. The client directive can provide specific instructions regarding the manner in which the database stored at the client device is to be updated using the delta. For example, the client directive can provide instructions regarding insertion, addition, or deletion of data. More particularly, the client directive can instruct the client device to store the database record data in the first database, insert at least a portion of the database record data at a particular location in the first database, replace particular data in the first database with at least a portion the database record data, or delete one or more identified database records from the first database. In this manner, the server system can instruct the client device to update its local copy of its client database.

In some implementations, the delta and/or directive can be represented in digital form. More particularly, the directive can indicate or specify byte(s) that are to be deleted, inserted, and/or replaced.

The server system transmits the database message to the client device at 514. The client device can update its local copy of its client database according to the delta and directive.

The system can verify that the database message has been received by the client device. Alternatively, the server system can verify that the client device has successfully updated its database. For example, the server system can query the mobile application installed on the client device to ascertain whether the client database has been successfully updated.

The server system can save the second database in association with the client identifier. After confirming that the client device has successfully received the database message and/or updated its local database, the server system can delete the prior version of the client database so that the second database it has generated replaces the previous client database it maintains in association with the client device. In this manner, the server system may maintain its own copies of client database(s) for each client device and/or user that is identical to database(s) stored locally at the corresponding client device.

In some implementations, the server system verifies that the client device has sufficient available memory to store information it receives from the server system. For example, the server system can query the client device regarding the amount of memory it has available prior to sending the first database or any subsequent database messages pertaining to updates to the first database. Alternatively, the client device (e.g., mobile application installed on the client device) can proactively message the server regarding the amount of memory resources it has available. The server system can send the first database or database message after confirming that the client device has sufficient memory resources to store the first database and/or subsequent updates.

In the above-described examples, a single database message is generated and transmitted. However, these examples are merely illustrative. Therefore, any number of database messages can be transmitted to a client device to facilitate the transfer of data for offline use.

Some but not all of the techniques described or referenced herein are implemented using or in conjunction with a database system. Salesforce.com, inc. is a provider of customer relationship management (CRM) services and other database management services, which can be accessed and used in conjunction with the techniques disclosed herein in some implementations. In some but not all implementations, services can be provided in a cloud computing environment, for example, in the context of a multi-tenant database system. Thus, some of the disclosed techniques can be implemented without having to install software locally, that is, on computing devices of users interacting with services available through the cloud. Some of the disclosed techniques can be implemented via an application installed on computing devices of users.

Information stored in a database record can include various types of data including character-based data, audio data, image data, animated images, and/or video data. A database record can store one or more files, which can include text, presentations, documents, multimedia files, and the like. Data retrieved from a database can be presented via a computing device. For example, visual data can be displayed in a graphical user interface (GUI) on a display device such as the display of the computing device. In some but not all implementations, the disclosed methods, apparatus, systems, and computer program products may be configured or designed for use in a multi-tenant database environment.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 6A:
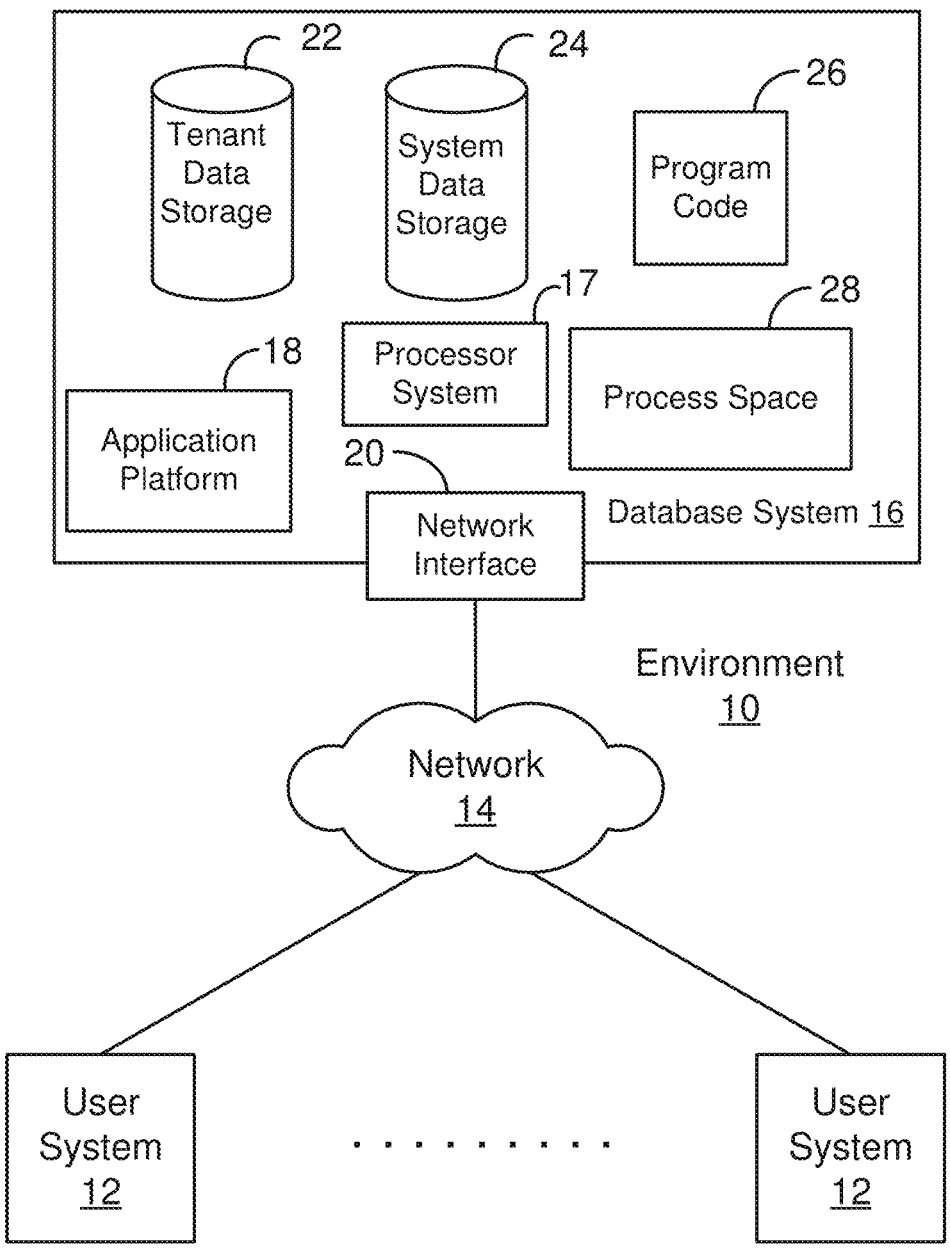
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7A:
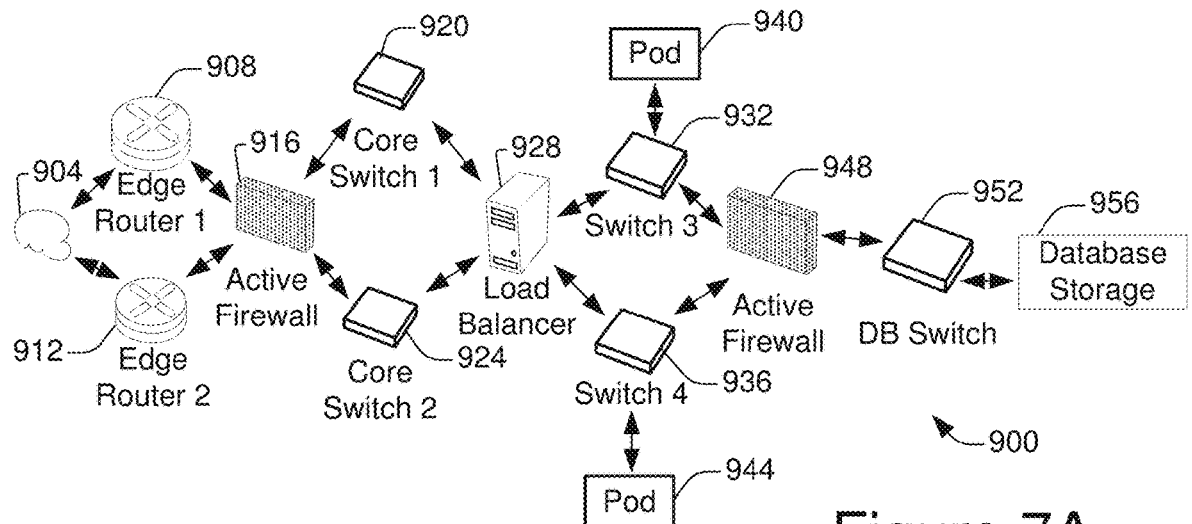
FIG. 7A shows a system diagram of an example of architectural components of an on-demand database service environment 900, in accordance with some implementations.
Figure 7B:
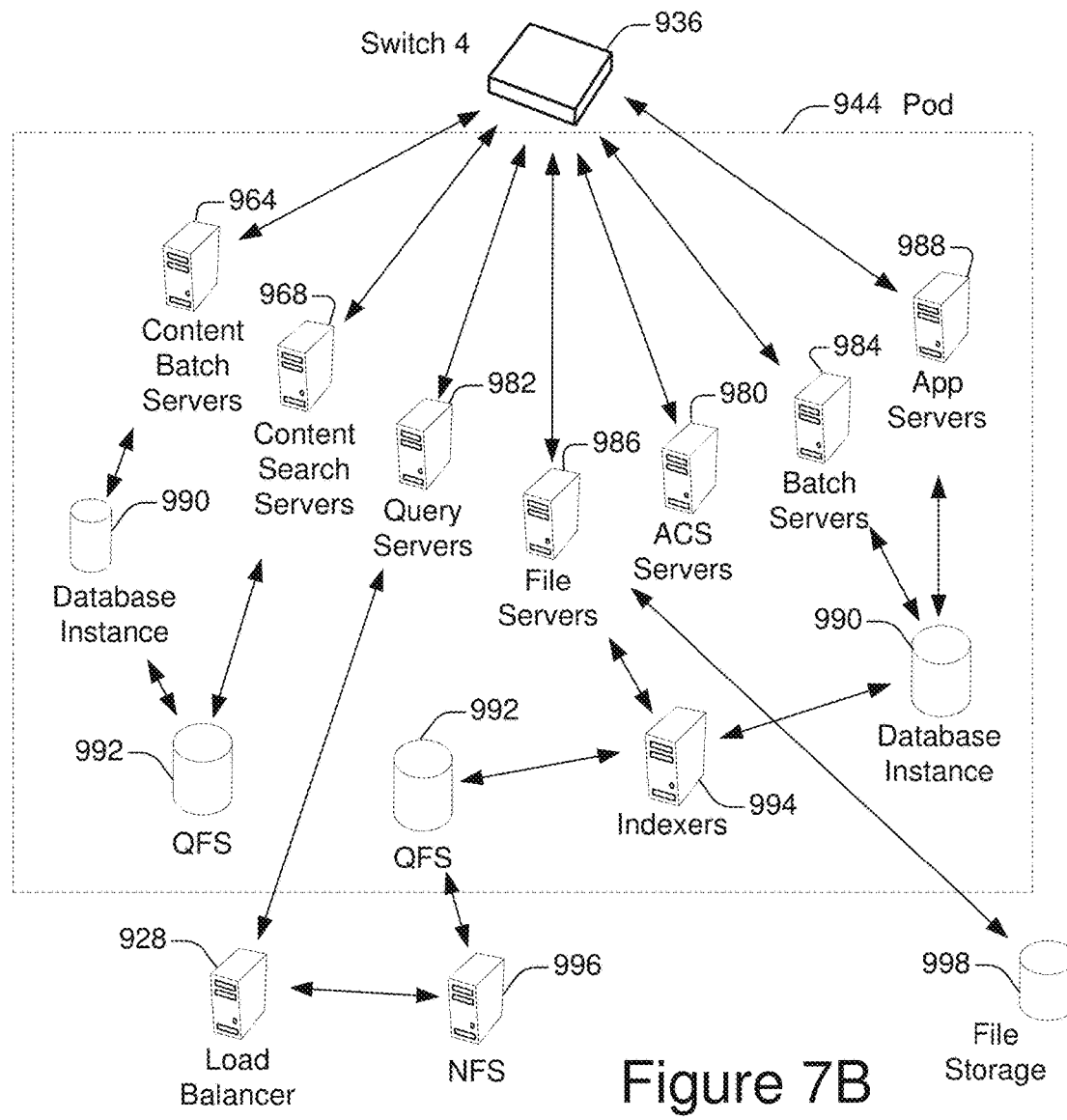
FIG. 7B shows a system diagram further illustrating an example of architectural components of an on-demand database service environment, in accordance with some implementations.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 6B:
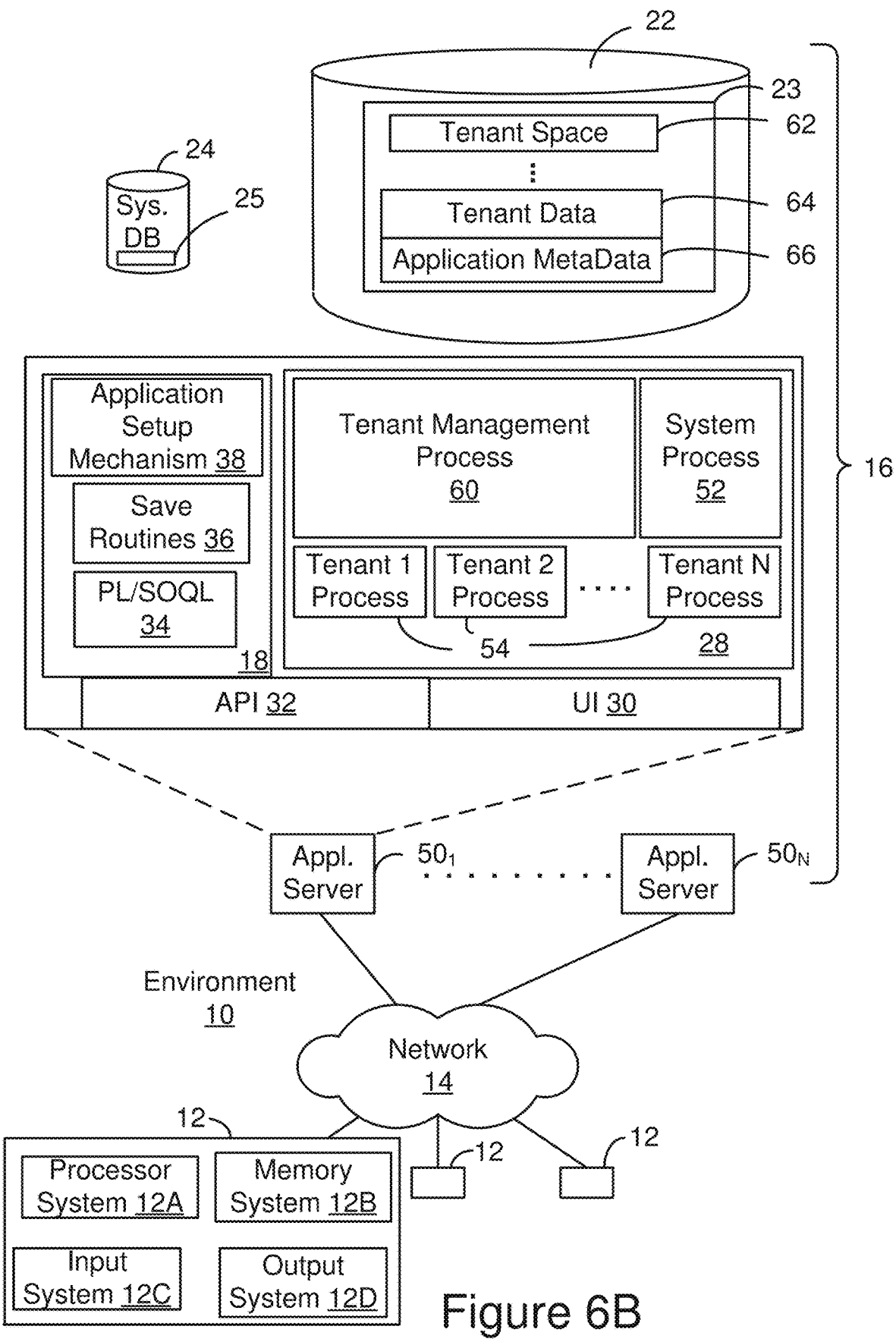
FIG. 6B shows a block diagram of an example of some implementations of elements of FIG. 6A and various possible interconnections between these elements.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 7B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 7B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 6A, 6B, 7A and 7B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 6A, 6B, 7A and 7B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
   a database system implemented using a server system comprising one or more processors, the database system configurable to cause:
   generating a first database for a client device, the first database including a plurality of database records, the client device being a handheld mobile device;
   storing, in association with the first database, a client identifier of the client device;
   transmitting the first database to the client device responsive to receiving a first message from the client device;
   after transmitting the first database to the client device and responsive to receiving a second message from the client device, obtaining one or more data;
   generating a delta between database records stored in the first database and the data, the delta representing database record data not stored in the first database;
   generating a database message indicating the delta and including a client directive to update the first database according to the delta;
   suspending or refraining from transmission of the database message to the client device responsive to receiving a third message from the client device, the third message indicating that the client device has insufficient memory associated with the directive to update the first database according to the delta;
   verifying that the client device has sufficient memory by at least processing a fourth message received from the client device, the fourth message indicating that the client device has released memory and indicating an amount of available memory; and
   resuming or initiating transmission of the database message to the client device responsive to verifying that the client device has sufficient memory.

2. The system as recited in claim 1, the client directive instructing the client device to perform at least one of: store the database record data in the first database, insert at least a portion of the database record data at a particular location in the first database, replace particular data in the first database with at least a portion of the database record data, or delete one or more identified database records from the first database.

3. The system as recited in claim 1, the database system further configurable to cause:
   verifying that the client device has sufficient available memory prior to transmitting the first database to the client device.

4. The system as recited in claim 1, the database system further configurable to cause:
   storing a first client database identical to the first database;
   wherein obtaining the data comprises generating a second client database associated with the client device, the second client database including the data;
   wherein generating the delta between database records stored in the first database and the data includes ascertaining a difference between the first client database and the second client database.

5. The system as recited in claim 4, the database system further configurable to cause:
   storing the second client database in association with the client identifier such that the second client database replaces the first client database.

6. The system as recited in claim 4, the database system further configurable to cause:
   storing the second client database in association with the client identifier; and
   deleting the first client database after determining that the client device has successfully received the delta.

7. A computer program product comprising a non-transitory computer-readable medium storing computer-readable program code capable of being executed by one or more processors, the program code comprising computer-readable instructions configurable to cause:

generating a first database for a client device, the first database including a plurality of database records, the client device being a handheld mobile device;

storing, in association with the first database, a client identifier of the client device;

transmitting the first database to the client device responsive to receiving a first message from the client device;

after transmitting the first database to the client device and responsive to receiving a second message from the client device, obtaining one or more data;

generating a delta between database records stored in the first database and the data, the delta representing database record data not stored in the first database;

generating a database message indicating the delta and including a client directive to update the first database according to the delta;

suspending or refraining from transmission of the database message to the client device responsive to receiving a third message from the client device, the third message indicating that the client device has insufficient memory associated with the directive to update the first database according to the delta;

verifying that the client device has sufficient memory by at least processing a fourth message received from the client device, the fourth message indicating that the client device has released memory and indicating an amount of available memory; and resuming or initiating transmission of the database message to the client device responsive to verifying that the client device has sufficient memory.

8. The computer program product as recited in claim 7, the client directive instructing the client device to perform at least one of: store the database record data in the first database, insert at least a portion of the database record data at a particular location in the first database, replace particular data in the first database with at least a portion of the database record data, or delete one or more identified database records from the first database.

9. The computer program product as recited in claim 7, the computer-readable instructions further configurable to cause:

verifying that the client device has sufficient available memory prior to transmitting the first database to the client device.

10. The computer program product as recited in claim 7, the computer-readable instructions further configurable to cause:

storing a first client database identical to the first database;

wherein obtaining the data comprises generating a second client database associated with the client device, the second client database including the data;

wherein generating the delta between database records stored in the first database and the data includes ascertaining a difference between the first client database and the second client database.

11. The computer program product as recited in claim 10, the computer-readable instructions further configurable to cause:

storing the second client database in association with the client identifier such that the second client database replaces the first client database.

12. The computer program product as recited in claim 10, the computer-readable instructions further configurable to cause:

storing the second client database in association with the client identifier; and deleting the first client database after determining that the client device has successfully received the delta.

13. A method, comprising:

generating a first database for a client device, the first database including a plurality of database records, the client device being a handheld mobile device;

storing, in association with the first database, a client identifier of the client device;

transmitting the first database to the client device responsive to receiving a first message from the client device;

after transmitting the first database to the client device and responsive to receiving a second message from the client device, obtaining one or more data;

generating a delta between database records stored in the first database and the data, the delta representing database record data not stored in the first database;

generating a database message indicating the delta and including a client directive to update the first database according to the delta;

suspending or refraining from transmission of the database message to the client device responsive to receiving a third message from the client device, the third message indicating that the client device has insufficient memory associated with the directive to update the first database according to the delta;

verifying that the client device has sufficient memory by at least processing a fourth message received from the client device, the fourth message indicating that the client device has released memory and indicating an amount of available memory; and resuming or initiating transmission of the database message to the client device responsive to verifying that the client device has sufficient memory.

14. The method as recited in claim 13, the client directive instructing the client device to perform at least one of: store the database record data in the first database, insert at least a portion of the database record data at a particular location in the first database, replace particular data in the first database with at least a portion of the database record data, or delete one or more identified database records from the first database.

15. The method as recited in claim 13, further comprising:

verifying that the client device has sufficient available memory prior to transmitting the first database to the client device.

16. The method as recited in claim 13, further comprising:

storing a first client database identical to the first database;

wherein obtaining the data comprises generating a second client database associated with the client device, the second client database including the data;

wherein generating the delta between database records stored in the first database and the data includes ascertaining a difference between the first client database and the second client database.

17. The method as recited in claim 16, further comprising:

storing the second client database in association with the client identifier such that the second client database replaces the first client database.

* * * * *